United States Patent
Swaminathan et al.

(10) Patent No.: US 10,159,045 B2
(45) Date of Patent: Dec. 18, 2018

(54) DEVICE-BASED SOLUTIONS TO POWER DRAIN CAUSED BY CONTINUOUS SWITCHING BETWEEN DIFFERENT RADIO ACCESS TECHNOLOGY NETWORKS

(71) Applicant: Apple Inc., Cupertino, CA (US)

(72) Inventors: Arvind Swaminathan, San Jose, CA (US); Venkateswara Rao Manepalli, Sunnyvale, CA (US); Lakshmi N. Kavuri, San Jose, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 15/178,206

(22) Filed: Jun. 9, 2016

(65) Prior Publication Data
US 2017/0359782 A1    Dec. 14, 2017

(51) Int. Cl.
```
H04W 36/24      (2009.01)
H04W 36/28      (2009.01)
H04W 52/02      (2009.01)
H04J 11/00      (2006.01)
H04W 36/00      (2009.01)
H04W 64/00      (2009.01)
H04L 12/857     (2013.01)
H04L 12/26      (2006.01)
```
(Continued)

(52) U.S. Cl.
CPC ......... H04W 52/0245 (2013.01); H04J 11/00 (2013.01); H04L 43/16 (2013.01); H04L 47/2491 (2013.01); H04W 36/0022 (2013.01); H04W 36/245 (2013.01); H04W 64/003 (2013.01); H04W 36/00837 (2018.08); H04W 36/14 (2013.01); H04W 88/06 (2013.01); Y02D 70/126 (2018.01); Y02D 70/20 (2018.01)

(58) Field of Classification Search
CPC . H04W 36/14; H04W 52/0245; H04W 88/06; H04L 43/16; H04L 47/2491
See application file for complete search history.

(56) References Cited

U.S. PATENT DOCUMENTS 8,706,111 B2    4/2014  Cheng
2006/0258386 A1*  11/2006  Jeong .................... H04W 36/24
                                                                455/525

(Continued)

*Primary Examiner* — Mohamed A Kamara
*Assistant Examiner* — Ryan C Kavleski
(74) *Attorney, Agent, or Firm* — Meyertons Hood Kivlin Kowert & Goetzel, P.C.; Jeffrey C. Hood (57) ABSTRACT

A wireless communication device may detect, within a specified time duration, at least a specified number of occurrences of a sequence of events, which includes the wireless communication device transitioning from a second cellular network operating according to a second radio access technology (RAT) to a first cellular network operating according to a first RAT, the wireless communication device failing to remain on the first cellular network for more than a specified time duration, and the wireless communication device returning from the first cellular network to the second cellular network. At least in response to this detection, the wireless communication device may determine whether to attempt future transition to the first cellular network while operating in the second network, based on one or more conditions, and/or may adjust one or more parameters used by the wireless communication device to determine when to redirect from the second cellular network to the first cellular network.

20 Claims, 6 Drawing Sheets

(51) Int. Cl.
 *H04W 36/14* (2009.01)
 *H04W 88/06* (2009.01)

(56) References Cited

U.S. PATENT DOCUMENTS

| | | | |
|---|---|---|---|
| 2013/0295986 A1* | 11/2013 | Mueck | H04W 48/18 |
| | | | 455/552.1 |
| 2014/0099952 A1 | 4/2014 | Bhatnagar et al. | |
| 2015/0358868 A1* | 12/2015 | Wegmann | H04W 36/0083 |
| | | | 455/436 |
| 2016/0142956 A1 | 5/2016 | Wang et al. | |
| 2016/0142960 A1 | 5/2016 | Liu et al. | |
| 2016/0360445 A1* | 12/2016 | Eason | H04W 48/18 |
| 2017/0071021 A1* | 3/2017 | Jin | H04W 76/025 |
| 2017/0181042 A1* | 6/2017 | Dash | H04W 76/04 |

\* cited by examiner

DEVICE-BASED SOLUTIONS TO POWER DRAIN CAUSED BY CONTINUOUS SWITCHING BETWEEN DIFFERENT RADIO ACCESS TECHNOLOGY NETWORKS

FIELD OF THE INVENTION

The present application relates to wireless communication, and more particularly to a wireless communication device enhancing switching between operating on different radio access technology networks.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is the technology of choice for the majority of wireless network operators worldwide, providing mobile broadband data and high-speed Internet access to their subscriber base. LTE defines a number of downlink (DL) physical channels, categorized as transport or control channels, to carry information blocks received from the MAC and higher layers. LTE also defines three physical layer channels for the uplink (UL). The LTE standard supports packet switching with its all-IP network. However, voice calls in any of the wireless communication standards, such as GSM (Global Systems for Mobile), UMTS (Universal Mobile Telecommunications System) and CDMA2000 (Code Division Multiple Access 2000) are circuit switched, so with the adoption of LTE, carriers modified their voice call network in order to accommodate LTE.

Three different approaches have been taken in ensuring the seamless transmission of both voice calls and data over LTE. One approach is Voice over LTE (VoLTE), which is based on the Internet Protocol Multimedia Subsystem (IMS) network, with specific profiles for control and media planes of voice service on LTE defined by GSMA (GSM Association) in PRD (Products Requirement Document) IR.92. The voice service is delivered as data flows within the LTE data bearer. Consequently, there is no dependency on the legacy circuit switched voice network (CSVN). In a second approach, simultaneous voice and LTE (SVLTE), the mobile device operates simultaneously in the LTE and circuit switched (CS) modes, with the LTE mode providing data services and the CS mode providing the voice service. This is a solution solely based on the device, which does not have special requirements on the network and does not require the deployment of IMS. However, this solution can require expensive phones with high power consumption.

A third approach is referred to as CS fallback (CSFB), according to which communication falls back to the CS domain, for example when calls on LTE fail and/or when a voice call is initiated or received outside LTE coverage area, among others. Operators may simply upgrade the MSC (Mobile Service Center) instead of deploying the IMS, and therefore, can provide services quickly. However, the disadvantage is longer call setup delay. While VoLTE has been widely accepted as the desired solution for the future, the demand for voice calls today has led LTE carriers to introduce CSFB as a stopgap measure. When placing or receiving a voice call, LTE handsets may conduct VoLTE calls but they may also fall back to 2G or 3G networks for the duration of a call, for any number of reasons, as noted above.

While 3GPP (Third Generation Partnership Project) LTE technology has reached a certain level of maturity, there continues to be innovation in the area of network deployment strategies, the result of which are challenges to the user experience regarding voice calls. In addition, existing LTE network deployments continue to expose certain scenarios in which the voice calling user experience is sub-par. CSFB has been launched commercially by multiple MNOs (Mobile Network Operators). Compared to native CS calls, CSFB deployments continue to expose various problems such as additional call setup time, IRAT (Inter-Radio Access Technology) cell re-selection/handover failures and the inefficient return back to E-UTRAN (Evolved Universal Terrestrial Access Network), all of which severely impact user experience. One such problem presents itself when a wireless communication device (UE) is operating in coverage boundaries, and the UE keeps moving from a CS network to LTE, fails on LTE, returns to the CS network, with this back-and-forth switching between the networks persisting for extended periods of time. Such back-and-forth switching between the networks is referred to herein as "ping-ponging".

Other corresponding issues related to the prior art will become apparent to those skilled in the art after comparing such prior art with the improvements as described herein.

SUMMARY OF THE INVENTION

In one set of embodiments, a wireless communication device, or wireless user equipment device (UE) may transition between communicating on a first network that operates according to a first radio access technology (RAT), e.g. a packet switching (PS) long term evolution (LTE) network, and a second network that operates according to a second RAT, e.g. a circuit switching (CS) 1X network, using enhanced procedures.

Accordingly, in one set of embodiments, a wireless communication device (UE) device may be able to wirelessly communicate over a first cellular network operating according to a first radio access technology (RAT), e.g. LTE and may also be able to communicate over a second cellular network operating according to a second RAT, e.g. WCDMA/MHDR. The first cellular network may operate according to a first threshold value that corresponds to a cell quality metric indicating when the UE can camp on the first cellular network. The UE may detect, within a specified time duration, a scenario defined as (at least) a specified number of occurrences of the following sequence:
  the UE transitions from the second cellular network to the first cellular network
  the UE fails to remain on the first cellular network for more than a specified period of time
  as a consequence of failing to remain on the first cellular network for more than the specified period of time, the UE returns from the first cellular network to the second cellular network.

The above scenario, that is, the sequence of event described above occurring multiple times, for example two times, three times or any number of previously specified times during a given time period, is also referred to as "ping-ponging". In response to detecting the above scenario, the UE may determine whether to attempt to reselect/redirect to the first cellular network, based on a variety of factors. For example, the UE may use a comparison of the first threshold value with a second threshold value, where the second threshold value corresponds to a cell metric used by the UE to determine if the UE is to reselect from a cellular network operating according to a second RAT to a cellular network operating according to the first RAT. If the second threshold value is different from the first threshold value, e.g. if the second threshold value is lower than the first threshold value, the UE may modify the second threshold value by adding an offset value to the second threshold value, e.g. to at least match the first threshold value, and use the modified second threshold value to determine when to attempt to transition from the second cellular network to the first cellular network. In some embodiments, the UE may modify the second threshold value to exceed the first threshold value.

The UE may also determine if the UE is in a mobility state indicating low motion of the UE, and increasing a value of a better-system reselection timer in response to detecting the instance described above when the UE is in the low motion mobility state. In some embodiments, upon detecting "ping-ponging", the UE may ignore any redirection commands to redirect to the first cellular network. The UE may also ignore priority based reselection commands or any redirection commands to redirect to the first cellular network when a rejection by the first cellular network leads to the Tracking Area (TA) being blocked, leading to the UE being redirected (back) and/or moved from the first cellular network to the second cellular network.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
BS: Base Station
CS: Circuit Switched
PS: Packet Switched
CSFB: Circuit Switched Fallback
eCSFB: enhanced CSFB
DL: Downlink (from BS to UE)
UL: Uplink (from UE to BS)
FDD: Frequency Division Duplexing
TDD: Time Division Duplexing
GSM: Global System for Mobile Communication
LTE: Long Term Evolution
SRLTE: Suspend/Resume LTE
IE: Information Element
LBT: Long Bar Timer
RAT: Radio Access Technology
IRAT: Inter-Radio Access Technology
TX: Transmission
RX: Reception
UMTS: Universal Mobile Telecommunication System Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

DCI—refers to downlink control information. There are various DCI formats used in LTE in PDCCH (Physical Downlink Control Channel). The DCI format is a predefined format in which the downlink control information is packed/formed and transmitted in PDCCH.

Figure 1:
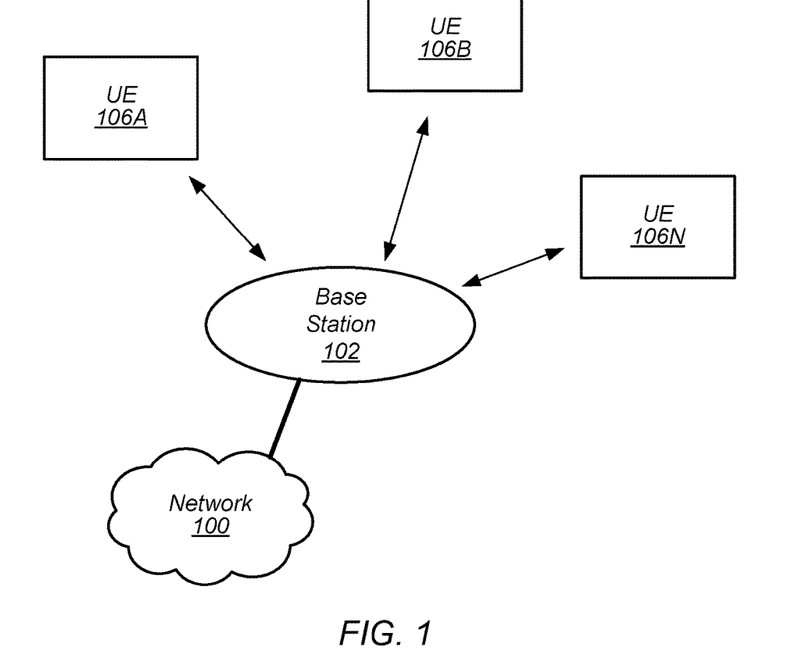
FIG. 1 shows an exemplary (and simplified) wireless communication system.
Figure 2:
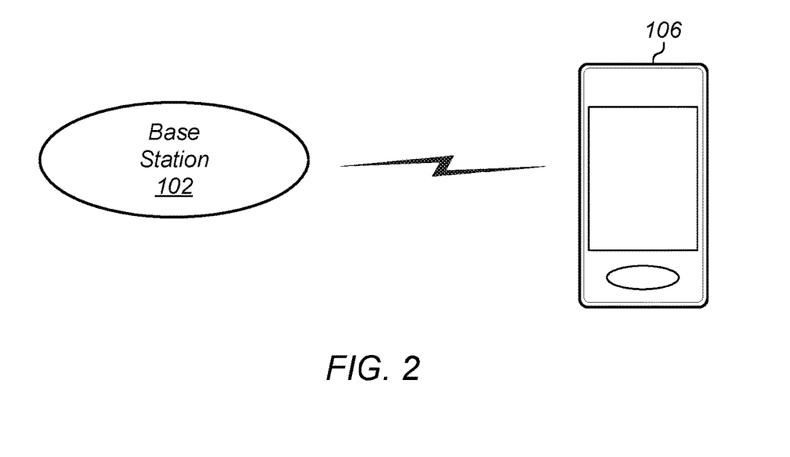
FIG. 2 shows an exemplary base station in communication with an exemplary wireless communication device (UE) according to some embodiments.

FIGS. 1 and 2—Exemplary Communication Systems

FIG. 1 illustrates an exemplary (and simplified) wireless communication system. It is noted that the system of FIG. 1 is merely one example of a possible system, and embodiments may be implemented in any of various systems, as desired. As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106A-106N are referred to as UEs or UE devices. Furthermore, when referring to an individual UE in general, user devices are also referenced herein as UE 106 or simply UE.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating over the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc. In some embodiments, the base station 102 communicates with at least one UE that uses improved techniques for determining when to switch between cellular networks operating according to different radio access technologies.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to communicate with base station 102 according to improved circuit switched fallback (CSFB) methods as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary system in which user equipment 106 (e.g., one of the devices 106-1 through 106-N) is in communication with the base station 102. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1xRTT, and separate radios for communicating using each of WiFi™ and BLUETOOTH™. Other configurations are also possible.

Figure 3:
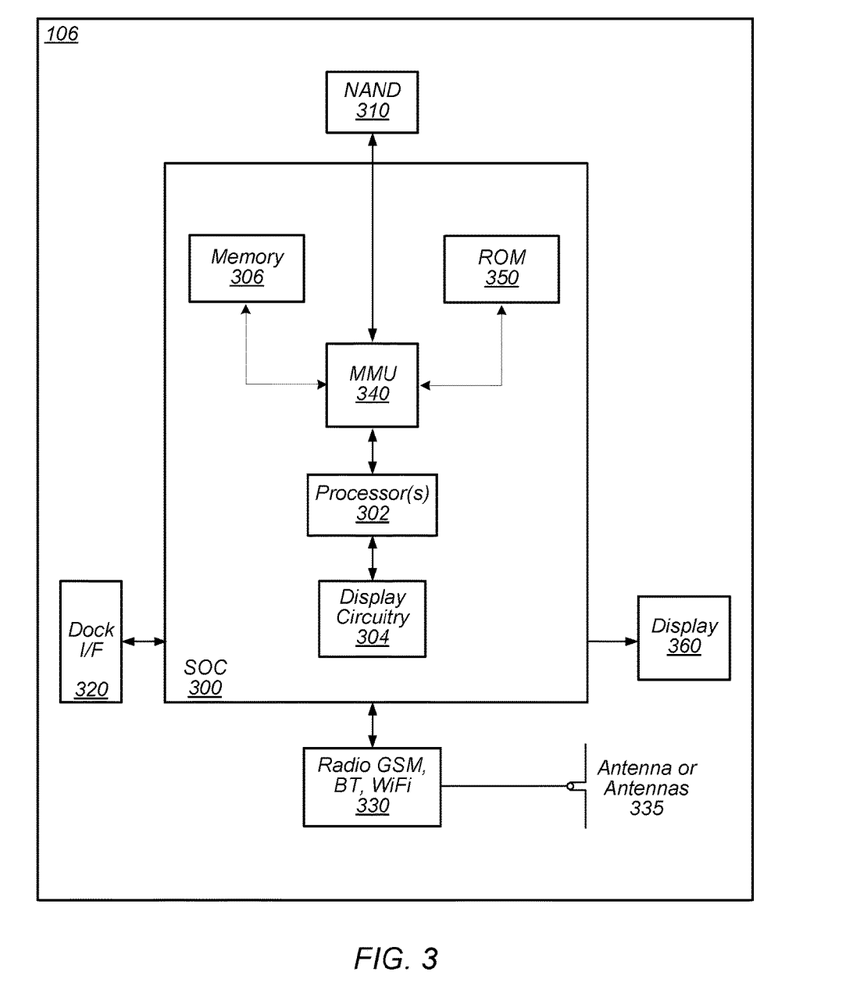
FIG. 3 shows an exemplary block diagram of a UE, according to some embodiments.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, BLUETOOTHT™, WiFi™, GPS, etc.). The UE device 106 may include at least one antenna 335, and possibly multiple antennas 335, for performing wireless communication with base stations and/or other devices. For example, the UE device 106 may use antenna(s) 335 to perform the wireless communication. As noted above, the UE may be configured to communicate wirelessly using multiple wireless communication standards in some embodiments.

As described further subsequently herein, the UE 106 (and base station 102) may include hardware and software components for implementing a method for enhanced handling of CSFB, or more generally for enhanced switching by the UE device between cellular networks operating according to different RATs, that is, enhanced switching by the UE device from communicating over a cellular network operating according to a first RAT to communicating over a cellular network operating according to a second RAT. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit), or as a combination of general purpose microprocessor, FPGA and/or ASIC. Furthermore, processor(s) 302 may be coupled to and/or may interoperate with other components as shown in FIG. 3, to implement enhanced switching by the UE device between communicating over cellular networks operating according to different RATs, according to various embodiments disclosed herein.

Figure 4:
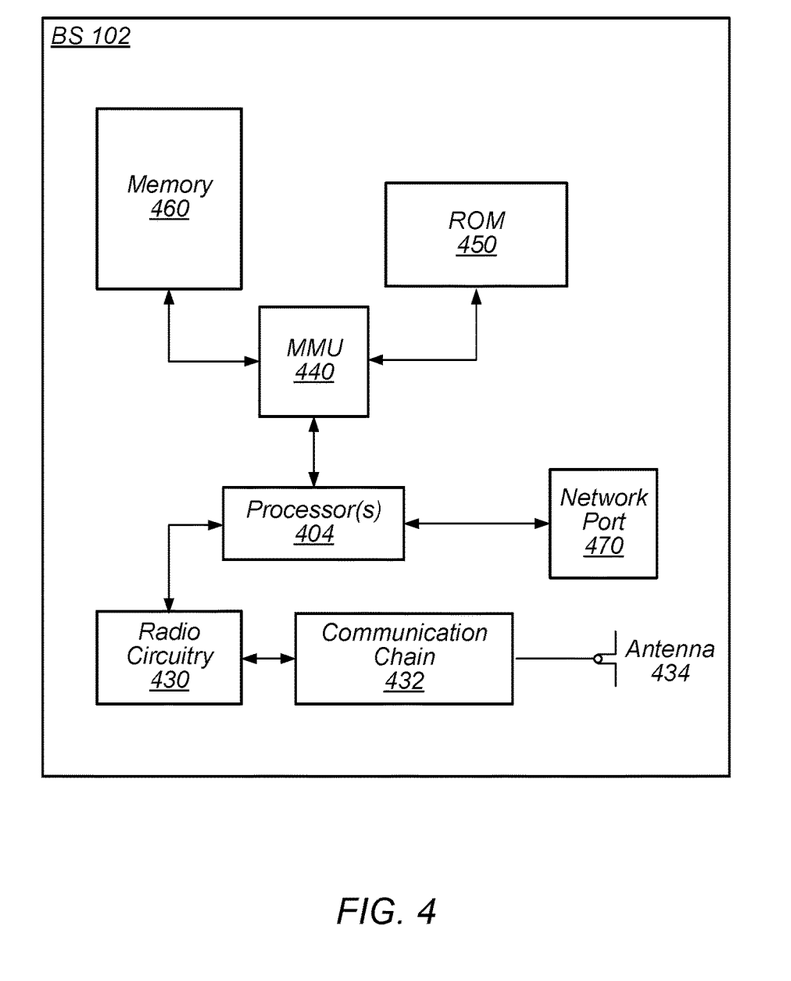
FIG. 4 shows an exemplary block diagram of a base station, according to some embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas 434. The antenna(s) 434 may be configured to operate as a wireless transceiver and may be further configured to communicate with UE devices 106 via radio 430. The antenna 434 may communicate with the radio 430 via communication chain 432. Communication chain 432 may be a receive chain, a transmit chain or both. The radio 430 may be configured to communicate via various wireless telecommunication standards, including, but not limited to, LTE, LTE-A WCDMA, CDMA2000, etc. The processor(s) 404 of the base station 102 may be configured to implement part or all of the methods described herein for improved CSFB handling, e.g., by executing program instructions stored on a memory medium (e.g., a non-transitory computer-readable memory medium). Alternatively, the processor(s) 404 may be configured as a programmable hardware element, such as an FPGA (Field Programmable Gate Array), or as an ASIC (Application Specific Integrated Circuit), or a combination thereof.

Figure 5:
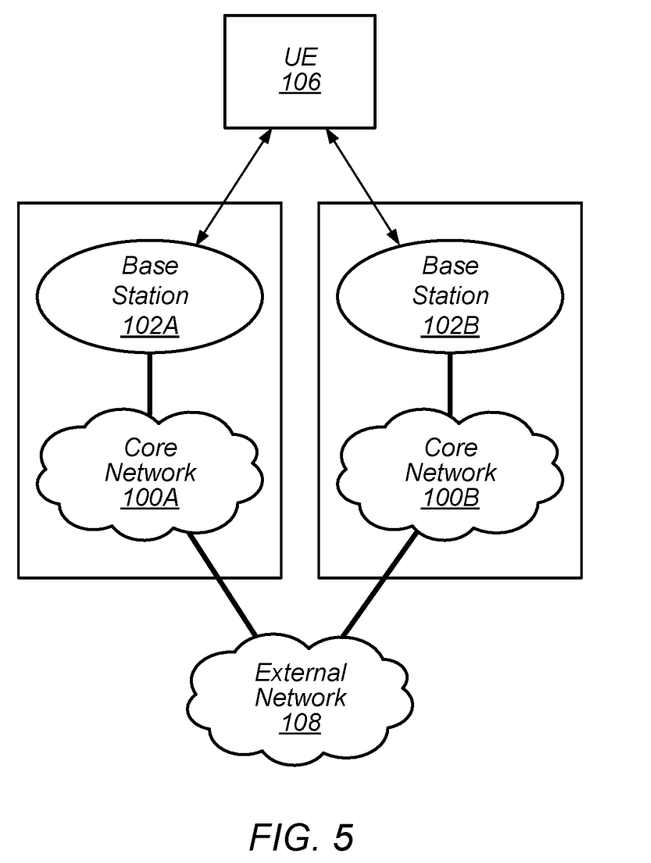
FIG. 5 shows an exemplary block diagram of a cellular communication network according to some embodiments.

FIG. 5—Communication System

FIG. 5 illustrates an exemplary (and simplified) wireless communication system. It is noted that the system of FIG. 5 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), etc.

In some embodiments, base station 102A and core network 100A may operate according to a first RAT (e.g., LTE) while base station 102B and core network 100B may operate according to a second (e.g., different) RAT (e.g., GSM, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 5, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and CDMA2000 1xRTT, and/or any other combination of RATs) might be coupled to a core network that also supports the different cellular communication technologies. In one embodiment, the UE 106 may be configured to use a first RAT that is a packet-switched technology (e.g., LTE) and a second RAT that is a circuit-switched technology (e.g., GSM or 1xRTT).

As discussed above, UE 106 may be capable of communicating using multiple RATs, such as those within 3GPP, 3GPP2, or any desired cellular standards. The UE 106 might also be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 6:
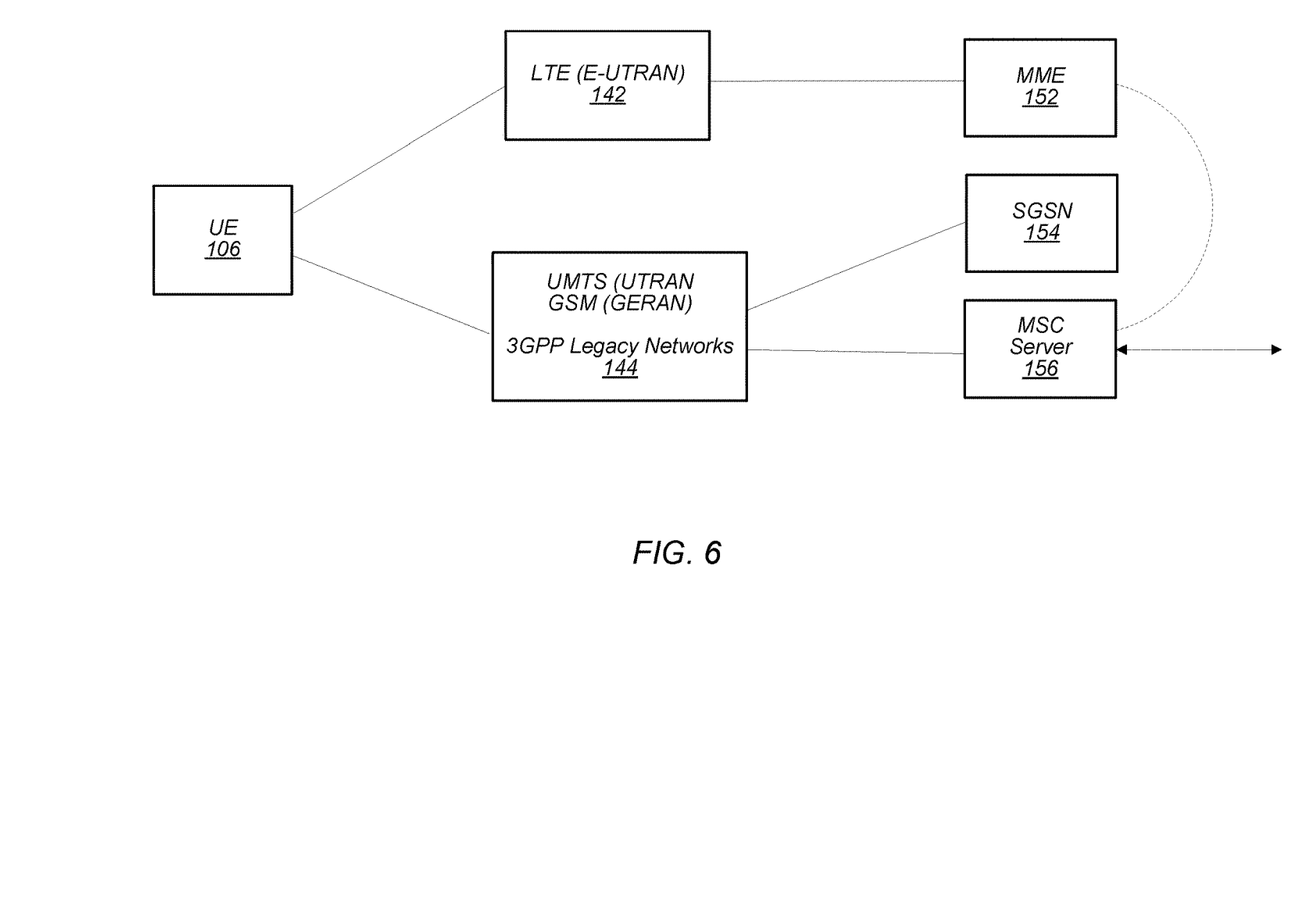
FIG. 6 shows a more detailed block diagram of a cellular communication network including both LTE and a 3GPP network according to some embodiments.

FIG. 6—Communication over Networks Operating According to Different RATs

FIG. 6 illustrates a more detailed example of a communication scenario that may involve switching operation of a UE device between different networks operating according to different RATs. More particularly, FIG. 6 shows a simplified view of an example network architecture with parallel LTE and 2G/3G networks. As shown in FIG. 6, the LTE network 142 and the legacy 2G/3G network 144 may co-exist in the same geographic area, wherein both networks reside between the wireless communication device or UE (of a mobile customer, for example) and the common core network. The common core network may comprise an MME (Mobility management Entity) 152, an SGSN (Serving GPRS Support Node) 154, and an MSC (Mobile Switching Center) Server 156. GPRS refers to the General Packet Radio Service, which is a packet oriented mobile data service on 2G and 3G GSM (Global System for Mobile communications) networks.

The MME 152 may be operated to serve UEs while communicating using LTE. The SGSN 154 may be operated to serve UEs when they are communicating utilizing data services using 2G/3G networks. The MSC Server 156 may be operated to serve UEs when utilizing voice services using 2G/3G networks. The MSC Server 156 connects to the carrier's telephony network. The MME 152 connects to the MSC Server 156 to support CS Fallback signaling and SMS transfer for LTE devices.

The interface (SGSN) 154 situated between the MSC Server 156 and the LTE Mobile Management Entity (MME) 152 enables the UE to be both circuit-switched (CS) and packet-switched (PS) registered while on the LTE access network. This interface also enables the delivery of CS pages as well as SMS communications via the LTE access, without the UE having to leave the LTE network.

Selecting Networks Operating According to Different RATs

Embodiments described herein are directed to improvements that allow wireless communication devices (UEs) to improve switching from communicating over a first cellular network operating according to a first RAT to communicating over a second cellular network operating according to a second RAT. Various embodiments of wireless communications and network equipment, including UE devices, base stations and/or relay stations, and associated methods described herein facilitate improved performance during wireless communications, e.g. wireless communications that involve Long Term Evolution (LTE) communications and transmissions. Specifically, various embodiments described herein facilitate enhancing network redirection and/or reselection for UE devices moving between wireless cellular networks operating according to different RATs. In a general sense, LTE, for example, represents a packet switched (PS) network, while 1X, for example, represents a circuit switched (CS) network. Furthermore, various wireless system operators may provide CS and PS services over specific respective CS and PS networks. That is, specific CS and PS networks are oftentimes operated together, for example 1X/EVDO, GSM/EDGE, etc., when voice calls are carried over the CS network. In those instances, a specific PS network may always be associated with a specific CS network by the wireless system operator.

In some embodiments, the mobility of the device may be associated with a BSR (Better System Re-selection) algorithm. For example, when the UE is in a "driving" or moving state, there is a greater chance of the UE migrating into the coverage area of a different LTE cell than when the UE is in a "stationary" state. Consequently, the signal conditions and reselection parameters broadcast by the different LTE network may be different from the signal conditions and reselection parameters broadcast by the LTE cell at the UE's original location. Thus, instead of the UE waiting for the Long Bar Timer (LBT) to expire to scan for LTE systems (e.g. LTE networks/cells), the UE (through the BSR algorithm, for example) may scan for LTE cells if the device is in a "driving" or non-stationary state for at least a specified time period (e.g. for at least a specified number "x" of seconds). This is possible as the UE has knowledge about the existing LTE coverage based on the 1X availability. Hence, when a UE is operating on a CS network, e.g. in a 1X system, the UE may perform scans for LTE cells (e.g. through a BSR algorithm) when the UE has changed its location, and not perform the scan(s) if the UE remains stationary.

"Ping-Pong" effect (or "Ping-Ponging")

In some cases when a UE is within coverage areas of cellular networks operating according to different RATs, e.g. LTE vs. WCDMA, and the UE is operating near coverage boundaries, the UE may: (i) move/switch from communicating over a first cellular network operating according to a first RAT, e.g. WCDMA to communicating on a second cellular network operating according to a second RAT, e.g. LTE; (ii) fail to successfully remain on the second cellular network for at least a specified time duration; (iii) return to the first cellular network; and (iv) continue this cycle of switching back and forth between the two cellular networks. This scenario is often referenced as "ping-ponging". In some instances, for example, the UE may move/switch between LTE and 1X/HDR systems as described above. Furthermore, the above may be observed for both for reselections and redirections from 1X/HDR to LTE or WCDMA to LTE as the redirection/reselection threshold used by the W/1X/HDR system does not match (is different from) the camping threshold used by LTE network. For example, the threshold required by the LTE network for a UE device to camp on LTE might be different (e.g. higher) than the threshold used by the W/1X/HDR system to determine when the UE ought to redirect to or reselect to an LTE network.

For example, in some cases of ping-ponging due to redirection, the UE may be connected on a WCDMA network, and the WCDMA network may redirect the UE to an LTE network, but the UE may fail to successfully remain on the LTE network for at least a specified time duration and may therefore return to the WCDMA network, with this cycle repeating numerous times. One other reason for this is that the LTE network may be considered a high priority system but the UE may be in a weak LTE coverage area. Hence, when the UE is on a 1x/HDR network, it may periodically attempt to reselect to the LTE network but may fail on the LTE network and then return back to HDR, repeating this sequence numerous times. Ping-ponging by the UE between the cellular networks operating according to the different RATs may take place multiple times within a few seconds or even milliseconds, as the UE keeps scanning between the cellular networks operating according to the different RATs.

Such ping-ponging scenarios have multiple disadvantages. The UE may perform excessive scanning between the respective radio circuits (of the UE) corresponding to the different RATs. Consequently, the UE may also use one of the radio circuits in an attempt to register on a corresponding cellular network, but fail. The process may also result in continuous service interruptions for the user and a poor user experience, as well as excessive power drain in each of the above steps. Finally, when LTE coverage is weak, even though ping-ponging may not occur, the UE being camped on an LTE network leads to higher power drain when the UE remains stationary or near-stationary on the coverage borders.

In some cases ping-ponging may also occur due to the cellular network, e.g. LTE network rejecting the UE. For example, the LTE network may reject the UE, that is, it may prevent the UE from connecting to and/or camping on the LTE network, for example due to roaming behavior or due to a network outage, among other reasons. Such rejections by the cellular network may lead the UE to move to a lower priority cellular network, that is, to a cellular network operating according to a lower priority RAT, such as WCDMA, for example. Because of the rejection, the UE, while on the WCDMA network, may periodically, or based on reselection priorities and thresholds, keep retrying to camp on the LTE network. This retry interval may be as small as 1 second to as much as tens of minutes. More specifically, the rejection by the cellular network may lead to the Tracking Area (TA) being blocked and the UE moving to a cellular network operating according to a low priority RAT, such as WCDMA, where the UE again tries to transition back to LTE, which cannot take place due to the TA being blocked.

Enhanced Switching Between Networks Operating According to Different RATs

For at least the above reasons it may be desirable to avoid ping-ponging scenarios as much as possible. One goal is to ensure that unless coverage in a cellular network, e.g. a cellular network operating according to a high priority RAT, e.g. LTE, is strong enough for a UE to camp on that cellular network, the UE does not attempt to camp on that cellular network. In other words, a decision to camp on a first cellular network operating according to a first RAT (which may be a high priority RAT, e.g. LTE) may not be made simply based on whether certain metrics (from a second cellular network operating according to a second RAT (which may be a lower priority RAT, e.g. WCDMA) indicate that camping on the first cellular network may take place, but it may also take into consideration other factors used in making a determination of whether the UE could reliably establish itself on the first cellular network, e.g. establish itself such that it can at least reliably conduct calls.

Accordingly, in some embodiments, instead of blindly transitioning to the first cellular network (that operates according to the first RAT as noted above) and/or attempting to camp on the first cellular network, an offset may be applied to a reselection threshold used by the UE when operating in the second cellular network (that operates according to the second RAT as noted above) to determine whether to transition to, e.g. to attempt to camp on the first cellular network, before attempting to transition to the first cellular network and trying to register on the first cellular network. The UE may apply an offset value to the reselection threshold used by the UE for the reselection between RATs. The reselection threshold may have been provided by the second cellular network to indicate to the UE when to attempt to reselect to, e.g. to attempt to camp on, the first network. The offset value applied by the UE may be based on one or more of the following: a value configured at the UE, a value determined by the UE, or a value received by the UE from the second cellular network. By applying the offset value, the UE may avoid such ping-pong scenarios.

As alluded to above, when a UE is operating in a low-priority system (e.g. CDMA system), that is, the UE is communicating over a cellular network operating according to a low priority RAT, under normal circumstances the UE attempts to move to a higher priority system/cellular network, that is, to a cellular network operating according to a higher priority RAT, e.g. an LTE network. In lower priority systems (e.g. 1x/HDR) there is a timer (Better-System Reselection timer) for periodically attempting to get the device back to higher priority systems (e.g. to LTE). For example, every three (3) minutes the device may try to get back to a higher priority RAT cellular network. If it is observed that the UE switches back and forth between the two cellular networks (low priority RAT cellular network and higher priority RAT cellular network), the timer may be increased. For example, if the UE switches back and forth between the two systems at least a specified number of time within a specified time duration, that is, within a time period of specific duration, then the timer may be increased, and switching the UE back to the higher priority RAT cellular network may not be attempted as often. Thus, if the device is in a stationary or semi-stationary mobility state, the BSR timer may be increased after ping-ponging has been observed. In other words, the timer may be adjusted to cause the UE to wait longer before attempting to reconnect to a higher priority cellular network after failing to connect to that cellular network multiple times in a row within a specified time duration. It should be noted that the specific network types in reference to lower priority and higher priority systems/networks shown above are for illustrative purposes, as the priority level designation of various networks may vary and may be established differently in various different wireless communication systems. The priority level is merely an indication of which network the UE intends to transition from, and the target network to which the UE is attempting to transition.

In some embodiments, if a lower priority RAT cellular network, e.g. a WCDMA cellular network is redirecting the UE to a higher priority RAT cellular network, e.g. LTE, and the LTE coverage in the area where the UE happens to be located is not sufficiently strong and the UE fails to connect (and/or camp), or gets redirected back to WCDMA—after camping and connecting to LTE—as a result of certain conditions, e.g. network loading or adverse changes in signal integrity and/or signal strength, a ping-pong scenario may develop. Upon detecting the ping-pong scenario, if the WCDMA network gives a redirection for the same WCDMA and LTE frequency/cellular network combination, the UE may ignore the redirection command and remain on the WCDMA network. In legacy systems, even though the UE may have been redirected from the target network to the source network, the UE may still attempt to camp on the target network if the target network meets the camping thresholds. In ping-pong scenarios stemming from the redirection of the UE from the target network to the source network, the UE may apply an additional offset to the camping threshold value corresponding to the target network, and use the adjusted threshold value in determining when to transition to the target network, for example to attempt to camp on the target network, to ensure that the UE can avoid the ping-pong scenario when attempting to transition to the target network in question.

Another situation in which ping-pong scenarios may arise is when a UE is roaming. Today, no distinction is made between a UE being in a roaming state versus being in a non-roaming state when considering redirecting and/or connecting the UE to high(er) priority networks. Thus, when a UE is in a roaming state and cannot get service for (e.g., cannot connect to) a high priority RAT cellular network, e.g., an LTE network due to different reasons like a reject from the LTE network or a failure to camp on the LTE network, the rate at which connection to the LTE network is retried may be less aggressive. In other words, one or more of the measures described above may be taken to avoid a ping-pong scenario in that situation, including reducing the rate of search for LTE networks during roaming scenarios. Some examples of scenarios in which the rate of connection retries to a high priority cellular network such as an LTE network may be reduced include user disabled cellular data access on the UE (common in roaming cases) and/or the UE not being camped on a cellular network in the designated home country associated with the UE. For example, if the "cellular data" function on a UE is disabled, it may be unnecessary to attempt to access an LTE network, therefore searches and retries for an LTE network may be reduced or entirely eliminated in response to the "cellular data" feature being disabled. Similarly, searches and retries for an LTE network may be reduced or entirely eliminated in response to the UE not camping on a cellular network in the home country associated with (or corresponding to) the UE.

Figure 7:
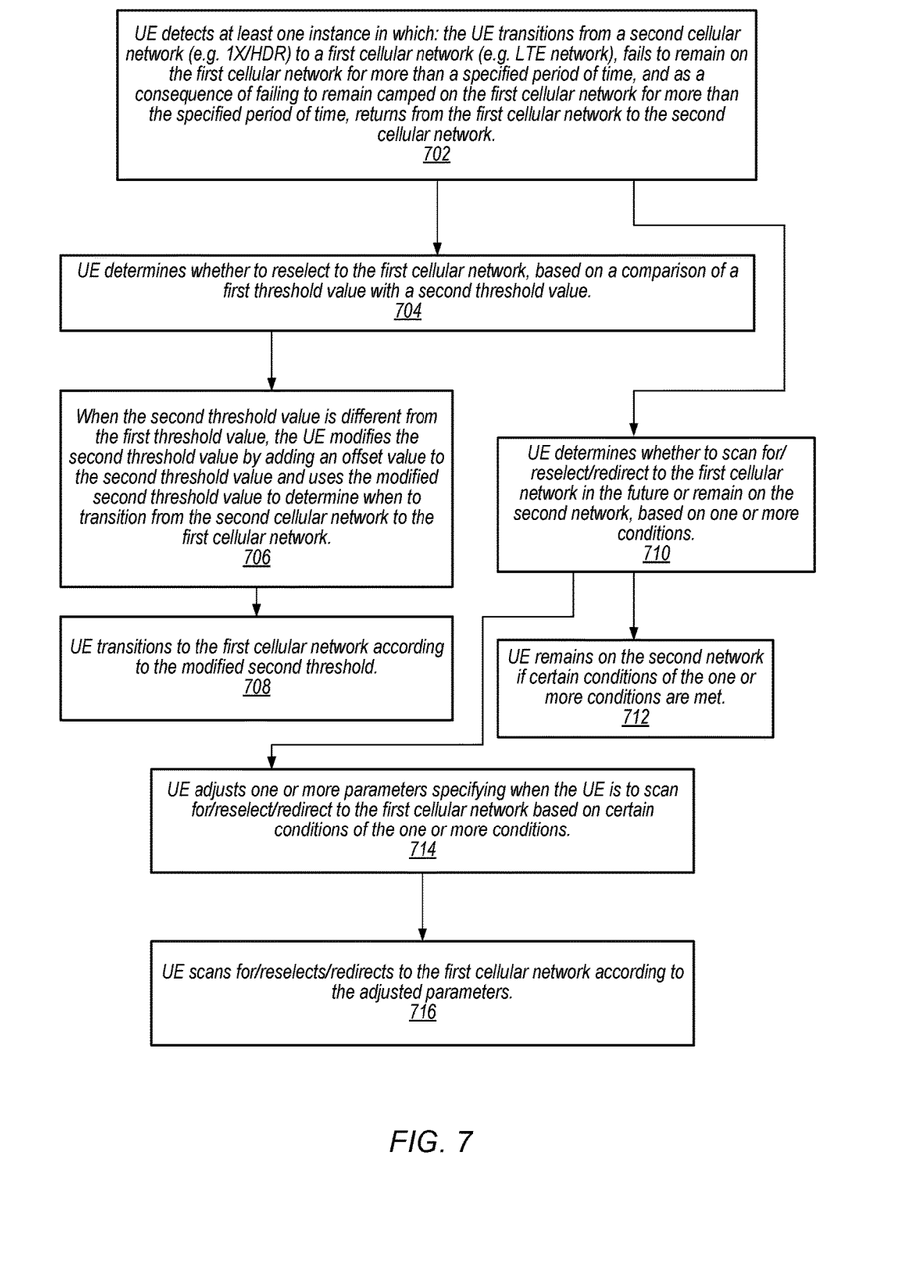
FIG. 7 shows a flowchart diagram illustrating an exemplary method for a UE switching between cellular networks operating according to different radio access technologies, according some embodiments.

FIG. 7

FIG. 7 shows a flowchart diagram illustrating an exemplary method for a UE switching between cellular networks operating according to different RATs, according to some embodiments. A wireless communication device (UE) may have the capability to wirelessly communicate over a first cellular network operating according to a first radio access technology (RAT), e.g. LTE and may also have the capability to communicate over a second cellular network operating according to a second RAT, e.g. WCDMA/1X/HDR. The first cellular network may operate according to a first threshold value associated with a cell quality metric indicating when the UE can camp on the first cellular network.

The UE may detect at least one instance of a scenario, whereby the scenario includes: (i) the UE transitioning from the second cellular network to the first cellular network, (ii) the UE failing to remain on the first cellular network for more than a specified period of time, and as a consequence of failing to remain on the first cellular network for more than the specified period of time, (iii) the UE returning from the first cellular network to the second cellular network (702). There may be various reasons why the UE might fail to remain on the first cellular network for at least a specified time duration. For example, the UE may fail to camp on the first cellular network, or the UE may successfully camp on the first cellular network but may be redirected to the second cellular network before the specified time period has elapsed due to one or more reasons.

In response to detecting at least one instance of the scenario, (or detecting multiple instances of the scenario within a specified time duration), the UE may determine whether to reselect to the first cellular network, based on a comparison of a first threshold value with a second threshold value (704). For example, the UE may determine whether to reselect to the first cellular network, based on a comparison of the first threshold value with a second threshold value, where the second threshold value is associated with a cell metric used by the UE to determine whether to reselect from a cellular network operating according to a second RAT to a cellular network operating according to the first RAT. When the second threshold value is different from the first threshold value, the UE may modify the second threshold value by adding an offset value to the second threshold value and may use the modified second threshold value to determine when to transition from the second cellular network to the first cellular network (706). In some embodiments, the UE may modify the second threshold value to at least match the first threshold value. In some embodiments, the UE may modify the second threshold value to exceed the first threshold value, for example when the UE still detects the scenario when the second threshold value matches the first threshold value. In some embodiments, the UE may modify the second threshold value in response to detecting the scenario described above occurring multiple times in succession within a time period of specified duration. The UE may then transition to the first cellular network to the first cellular network according to the modified second threshold (708).

In some embodiments, upon detecting the scenario (702), the UE may determine whether to scan for/reselect/redirect to the first cellular network or remain on the second cellular network, based on one or more conditions (710). These conditions may include among others, a mobility state of the UE, that is, whether the UE is moving slowly or is in a stationary state, whether the UE is in a coverage area of the first cellular network that is limited and/or insufficient to reliably conduct calls, the first cellular network rejecting the UE (possibly due to roaming behavior or a network outage), cellular data being disabled on the UE, and/or the UE not being located in a home country associated with the UE. The UE may remain on the second cellular network if certain conditions of the one or more conditions are met (712). For example, if upon detection of the scenario the second cellular network gives a redirection or the UE performs priority based reselection for the same second cellular network and first cellular network combination (e.g., the scenario involves the same first cellular network and the same second cellular network), the UE may ignore the redirection or priority based reselection command and remain on the second cellular network. Or the UE may ignore priority-based reselection when the UE is in a stationary or semi-stationary state. Other similar or like conditions may be identified as desired.

If the UE determines that it does not need to remain on the second cellular network without making any attempts at connecting to the first cellular network, the UE may adjust one or more parameters specifying when the UE is to scan for/reselect/redirect to and attempt to camp on the first cellular network, based on certain conditions of the one or more conditions (714). For example, the UE may increase a value of a better-system reselection timer in response to detecting the ping-pong scenario when the UE is in the low motion mobility state. That is, the UE may reduce the rate at which the UE scans for or tries to reselect the first cellular network. In some cases, in adjusting the one or more parameters the UE may increase the first threshold value and use the adjusted first threshold value to determine when to reselect to the first cellular network, for example when the scenario includes the UE successfully camping on the first cellular network but being redirected to the second cellular network prior to the expiration of the specified period of time (or time period of specified duration).

It should also be noted that various references are made herein for a wireless communication device moving from a first cellular network operating according to a first RAT to a second cellular network operating according to a second RAT, and potentially moving back-and-forth between the first cellular network and the second cellular network, e.g., ping-ponging between the two networks. While various embodiments disclosed herein discuss switching from a lower priority network to a higher priority network at the beginning of such a ping-ponging scenario, in various embodiments the ping-ponging may occur between any two networks operating according to different respective RATs, not necessarily between different priority cellular networks or between LTE and another type of RAT cellular network. For example, in some embodiments the first cellular network may be a WCDMA network and the second cellular network may be a GSM network, and reselection/redirection may be from either one to the other, and so on and so forth.

Various Embodiments

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless communication device comprising:
radio circuitry comprising one or more antennas configured to facilitate wireless communication over a cellular network; and
a processing element configured to interoperate with the radio circuitry to cause the wireless communication device to:
 detect at least one instance in which the wireless communication device:
  transitions from a second cellular network operating according to a second radio access technology (RAT) to a first cellular network operating according to a first RAT;
  fails to remain on the first cellular network for more than a period of specified duration;
  returns from the first cellular network to the second cellular network; and
 determine, at least in response to detecting the at least one instance and based on one or more conditions, whether to attempt future transition to the first cellular network at specified opportunities for the wireless communication device to connect to the first cellular network; and
 remain on the second cellular network when the wireless communication device is redirected and/or reselected to the first cellular network, in response to the determining indicating that the wireless communication device is not to attempt future transition to the first cellular network.

2. The wireless communication device of claim 1, wherein the first cellular network is a higher priority RAT network than the second cellular network.

3. The wireless communication device of claim 1, wherein the one or more conditions comprise one or more of the following:
a mobility state of the wireless communication device;
a strength of coverage of the first cellular network in an area where the wireless communication device is presently located;
a cellular data setting on the wireless communication device; or
whether the wireless communication device is located in a home country associated with the wireless communication device.

4. The wireless communication device of claim 1, wherein the processing element is further configured to cause the wireless communication device to:
adjust, at least in response to detecting the at least one instance, one or more parameters specifying when the wireless communication device is to attempt to connect to the first cellular network.

5. The wireless communication device of claim 4, wherein the one or more parameters comprise one or more of the following:
a threshold value corresponding to a cell quality metric associated with the first cellular network and used by the wireless communication device in determining whether to reselect to the first cellular network; or
a better-system reselection timer.

6. The wireless communication device of claim 5, wherein the processing element is further configured to cause the wireless communication device to:
compare the threshold value with a second threshold value corresponding to a cell quality metric associated with the first cellular network and used by the first cellular network to indicate when wireless communication devices can camp on the first cellular network; and
adjust the threshold value based at least on the second threshold value.

7. The wireless communication device of claim 5, wherein the processing element is further configured to cause the wireless communication device to:
add an offset value to the threshold value and use at least the adjusted threshold value to determine when to connect to the first cellular network.

8. An apparatus comprising:
a processing element configured to cause a wireless communication device to:
 detect, within a specified time duration, at least a specified number of occurrences of a sequence of events, wherein the sequence of events comprises:
  the wireless communication device transitioning from a second cellular network operating according to a second radio access technology (RAT) to a first cellular network operating according to a first RAT;
  the wireless communication device failing to remain on the first cellular network for more than a time period of specified duration; and
  the wireless communication device returning from the first cellular network to the second cellular network;
 determine, at least in response to detecting the at least a specified number of occurrences of the sequence of events within the specified time duration and based on one or more conditions, whether to attempt future transition to the first cellular network at specified opportunities for the wireless communication to connect to the first cellular network; and
 remain on the second cellular network when the wireless communication device is redirected and/or reselected to the first cellular network, in response to the determining indicating that the wireless communication device is not to attempt future transition to the first cellular network.

9. The apparatus of claim 8, wherein the processing element is further configured to cause the wireless communication device to:
ignore, at least in response to detecting the at least a specified number of occurrences of the sequence of events within the specified time duration, any redirection commands received from the second cellular network when the second cellular network gives a redirection from the second cellular network to the first cellular network; and
remain on the second cellular network.

10. The apparatus of claim 8, wherein the one or more conditions comprise one or more of the following:
a mobility state of the wireless communication device;
a strength of coverage of the first cellular network in an area where the wireless communication device is presently located;
a cellular data setting on the wireless communication device; or
whether the wireless communication device is located in a home country associated with the wireless communication device.

11. The apparatus of claim 8, wherein the processing element is further configured to cause the wireless communication device to:
adjust, at least in response to detecting the at least a specified number of occurrences of the sequence of events within the specified time duration, one or more parameters specifying when the wireless communication device is to attempt to connect to the first cellular network.

12. The apparatus of claim 11 wherein the one or more parameters comprise one or more of the following:
a threshold value corresponding to a cell quality metric associated with the first cellular network and used by the wireless communication device in determining whether to reselect to the first cellular network from the second cellular network; or
a better-system reselection timer.

13. The apparatus of claim 12, wherein the processing element is further configured to cause the wireless communication device to:
adjust the threshold value to exceed a second threshold value, wherein the second threshold value corresponds to a cell quality metric associated with the first cellular network and used by the first cellular network as an indicator of when wireless communication devices can camp on the first cellular network; and
use at least the adjusted threshold value to determine when to attempt to reselect to the first cellular network from the second cellular network.

14. The apparatus of claim 12, wherein the processing element is further configured to cause the wireless communication device to:
add an offset value to the threshold value and use at least the adjusted threshold value to determine when to attempt to reselect to the first cellular network from the second cellular network.

15. A non-volatile memory element configured to store programming instructions executable by a processing element to cause a wireless communication device to:
detect, within a specified time duration, at least a specified number of occurrences of a sequence of events, wherein the sequence of events comprises:
the wireless communication device transitioning from a second cellular network operating according to a second radio access technology (RAT) to a first cellular network operating according to a first RAT;
the wireless communication device failing to remain on the first cellular network for more than a time period of specified duration; and
the wireless communication device returning from the first cellular network to the second cellular network;
adjust, at least in response to detecting the at least a specified number of occurrences of the sequence of events within the specified time duration, one or more parameters specifying when the wireless communication device is to attempt to connect to the first cellular network from the second cellular network; and
attempt to connect to the first cellular network at a given occasion, if the adjusted one or more parameters indicate that the wireless communication device is to attempt to connect to the first cellular network at the given occasion.

16. The non-volatile memory element of claim 15, wherein the one or more parameters comprise one or more of the following:
a threshold value corresponding to a cell quality metric associated with the first cellular network and used by the wireless communication device in determining whether to reselect to the first cellular network from the second cellular network; or
a timer indicating when the wireless communication device is to reselect to the first cellular network from the second cellular network.

17. The non-volatile memory element of claim 16, wherein the programming instructions are further executable by the processing element to cause the wireless communication device to:
increase threshold value.

18. The non-volatile memory element of claim 16, wherein the programming instructions are further executable by the processing element to cause the wireless communication device to:
adjust the timer to increase a time period that elapses between successive attempts by the wireless communication device to reselect to the first cellular network from the second cellular network.

19. The non-volatile memory element of claim 15, wherein the programming instructions are further executable by the processing element to cause the wireless communication device to:
determine, at least in response to detecting the at least a specified number of occurrences of the sequence of events within the specified time duration, whether to redirect or reselect to the first cellular network while operating in the second cellular network, based at least on one or more conditions.

20. The non-volatile memory element of claim 19, wherein the one or more conditions comprise one or more of the following:
a mobility state of the wireless communication device;
a strength of coverage of the first cellular network in an area where the wireless communication device is presently located;
a cellular data setting on the wireless communication device; or
whether the wireless communication device is located in a home country associated with the wireless communication device.

* * * * *